United States Patent
Ikemoto et al.

(10) Patent No.: US 6,941,745 B2
(45) Date of Patent: Sep. 13, 2005

(54) EXHAUST GAS CLEANING SYSTEM OF INTERNAL COMBUSTION ENGINE

(75) Inventors: Noriaki Ikemoto, Kariya (JP); Hisashi Iida, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/442,126

(22) Filed: May 21, 2003

(65) Prior Publication Data

US 2003/0230073 A1 Dec. 18, 2003

(30) Foreign Application Priority Data

Jun. 18, 2002 (JP) ........................................ 2002-176767

(51) Int. Cl.$^7$ ................................................ F01N 3/00
(52) U.S. Cl. ........................... 60/285; 60/276; 73/23.32
(58) Field of Search ......................... 60/274, 276, 285; 73/118.1, 23.31, 23.32; 123/674, 679; 701/103, 109

(56) References Cited

U.S. PATENT DOCUMENTS

| | | | |
|---|---|---|---|
| 5,537,817 A | 7/1996 | Akazaki et al. | |
| 5,657,627 A | * 8/1997 | Akazaki et al. | ............... 60/276 |
| 6,256,981 B1 | * 7/2001 | Sullivan et al. | ............... 60/274 |
| 6,256,983 B1 | * 7/2001 | Yasui | ........................ 60/285 |
| 6,338,243 B1 | * 1/2002 | Takaoka et al. | ............... 60/277 |
| 6,539,707 B2 | * 4/2003 | Ikemoto et al. | ............... 60/285 |
| 6,622,478 B2 | * 9/2003 | Nakamura | ................... 60/285 |

FOREIGN PATENT DOCUMENTS

JP     B2-2946379     10/1994

* cited by examiner

Primary Examiner—Tu M. Nguyen
(74) Attorney, Agent, or Firm—Nixon & Vanderhye P.C.

(57) ABSTRACT

An exhaust gas cleaning system has two catalysts and three sensors. The target voltage of a second sensor arranged upstream of a downstream catalyst is set according to the output voltage of the second sensor and the output voltage of a third sensor. Thus, even if the output voltage of the second sensor shows a stoichiometric condition and the output voltage of the third sensor shows a rich condition, it is possible to restrict the unnecessary correction of the target voltage and to optimize the cleaning rate of the downstream catalyst. Therefore, it is possible to reduce emission from being impaired by an expected variation in the air-fuel ratio.

2 Claims, 5 Drawing Sheets

EXHAUST GAS CLEANING SYSTEM OF INTERNAL COMBUSTION ENGINE

CROSS REFERENCE TO RELATED APPLICATION

This application is based on and incorporates herein by reference Japanese Patent Application No. 2002-176767 filed on Jun. 18, 2002.

FIELD OF THE INVENTION

The present invention relates to an exhaust gas cleaning system of an internal combustion engine and in particular, to an air-fuel ratio control for performing the best cleaning rate of two catalysts that are provided in the exhaust gas system of the internal combustion engine to clean exhaust gas.

BACKGROUND OF THE INVENTION

In recent engine control systems, two catalytic converters are arranged in series in the exhaust system of an internal combustion engine. One catalytic converter is arranged on the upstream side in the exhaust system as an upstream catalyst and the other catalytic converter is arranged on the downstream side in the exhaust system as a downstream catalyst. In this system, an air-fuel ratio (A/F) sensor for linearly detecting an air-fuel ratio of fuel mixture is arranged upstream of the upstream catalyst. An oxygen sensor for detecting the air-fuel ratio on the upstream side of the downstream catalyst and an oxygen sensor for detecting the air-fuel ratio on the downstream side of the downstream catalyst are arranged upstream and downstream of the downstream catalyst, respectively. This system is disclosed in U.S. Pat. No. 5,537,817 (Japanese Patent No. 2869925) and Japanese Patent No. 2946379.

The above system performs a main feedback control for controlling an air-fuel ratio detected by the A/F sensor to a target air-fuel ratio. Further, a second feedback control for controlling an output voltage (second output voltage) detected by the oxygen sensor (second sensor) arranged downstream of the upstream catalyst to a second target voltage is performed. Still further, a third feedback control for controlling an output voltage (third output voltage) detected by the oxygen sensor (third sensor) arranged downstream of the downstream catalyst to a basic voltage is performed.

In the third feedback control, the third output voltage is so controlled to the basic voltage as to optimally keep the cleaning rate of the downstream catalyst. Then, in the third feedback control, in order to optimize the cleaning rate of the downstream catalyst, a second target voltage is set based on the output voltage of the third sensor. Further, in the second feedback control, in order to make the second output voltage follow the second target voltage set in the above manner, a target air-fuel ratio on the upstream side of the upstream catalyst is set. By keeping the cleaning rate of the downstream catalyst at an optimum value by the use of the second feedback control and the third feedback control, the air-fuel ratio of an exhaust gas discharged from the downstream catalyst is optimally controlled.

In order to optimally control the cleaning rate of the downstream catalyst, the second target voltage is set based only on the third output voltage. For this reason, even if the cleaning rate of the upstream catalyst is reduced, the exhaust gas supplied to the downstream catalyst is cleaned by the downstream catalyst. Therefore, the amount of harmful components in the exhaust gas finally discharged is reduced to a lower level.

However, the third sensor is arranged at the most downstream position of the engine in the exhaust system. For this reason, the third feedback control performed based on the output voltage of the third sensor has the largest delay in response among the three feedback controls. Thus, even if it is intended to reduce the cleaning rate of the upstream catalyst thereby to optimally keep the cleaning rate of the downstream catalyst, it is difficult to control the downstream catalyst at a proper cleaning rate with respect to an expected variation in the air-fuel ratio. Therefore, there is a possibility that the exhaust emission will deteriorate.

For example, in a case where the output voltage of the second sensor is stoichiometric and the output voltage of the third sensor is rich, the cleaning rate of the upstream catalyst is kept at an optimum value. That is, harmful components contained in the exhaust gas are significantly cleaned by the upstream catalyst. For this reason, optimizing the cleaning rate of the downstream catalyst is of less importance. In this condition, the second target voltage is changed by the third feedback control based on the third output voltage. As a result, the second output voltage is controlled at the target voltage by the second feedback control to reduce the cleaning rate of the upstream catalyst. As a result, it is likely that it will be difficult to keep the cleaning rate of the downstream catalyst at an optimum value.

SUMMARY OF THE INVENTION

It is therefore an object of the present invention to provide an air-fuel ratio control system capable of responding to an expected variation in the air-fuel ratio by controlling the cleaning rate of an upstream catalyst and a downstream catalyst at optimum values.

In a case where an upstream catalyst shows an extremely high cleaning rate, harmful components contained in exhaust gas discharged from an internal combustion engine are sufficiently cleaned by the upstream catalyst, so that optimizing the air-fuel ratio of a downstream catalyst is of less importance. On the other hand, in a case where the upstream catalyst does not show a high cleaning rate, optimizing the air-fuel ratio of the downstream catalyst is of importance.

According to the present invention, an exhaust gas cleaning system has an upstream catalyst and a downstream catalyst arranged in series in an engine exhaust as well as first to third air-fuel ratio sensors. A quantity of fuel supplied to an internal combustion engine is feedback-controlled as the first feedback control based on the first air-fuel ratio detected at the upstream side of the upstream catalyst. A first control parameter such as a target air-fuel ratio used in the first feedback control is corrected based on the second air-fuel ratio detected at the downstream side of the upstream catalyst. A second control parameter such as a target air-fuel ratio at the downstream of the first catalyst used in the second feedback control is corrected based on the second air-fuel ratio and a third air-fuel ratio detected at the downstream side of the downstream catalyst arranged downstream of the upstream catalyst.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
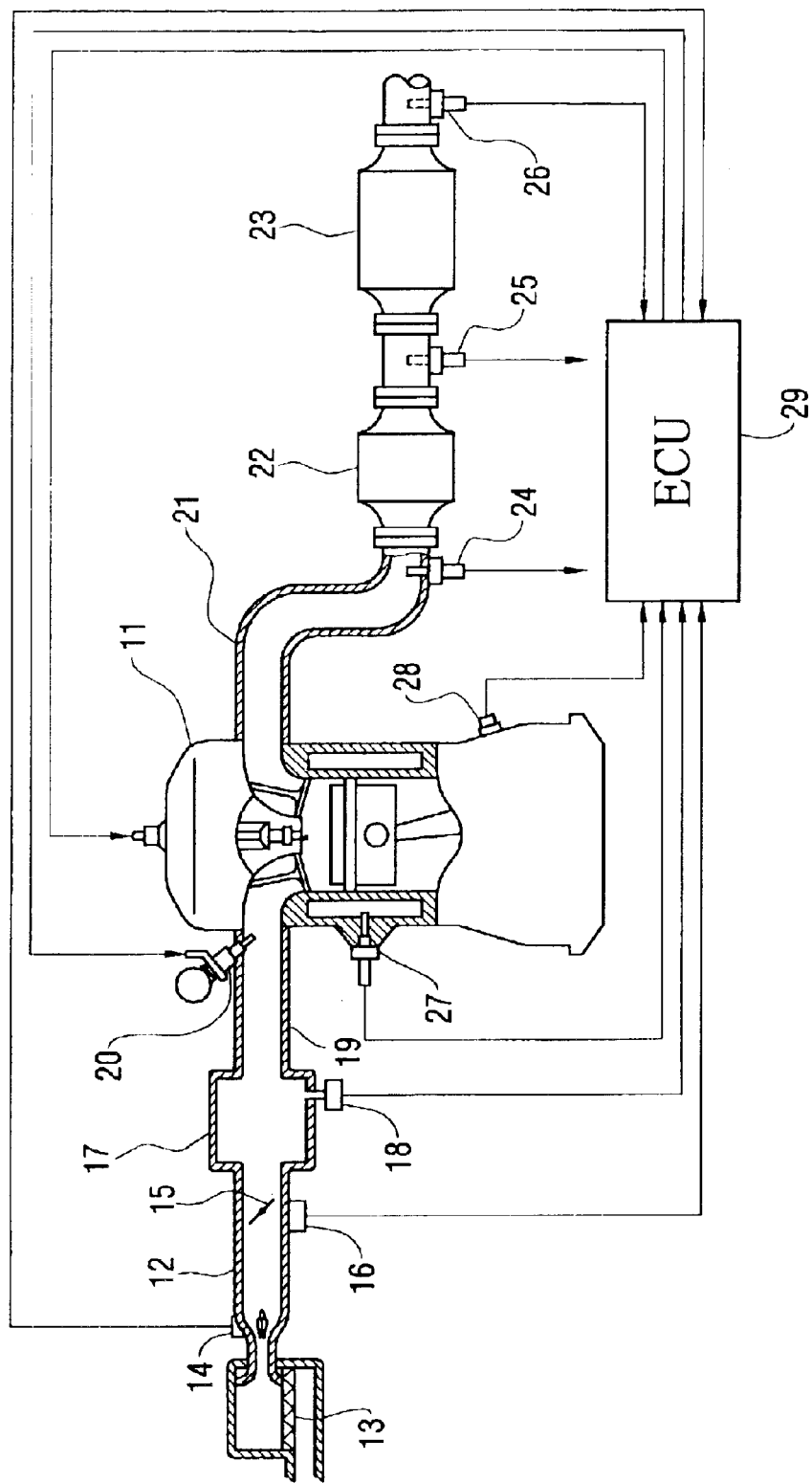
FIG. 1 is a schematic view of an engine control system according to one embodiment of the present invention.

Referring first to FIG. 1, an air cleaner 13 is provided at the most upstream position of an intake pipe 12 of an internal combustion engine 11. An air flow meter 14 for detecting an intake air quantity is provided downstream of the air cleaner 13. A throttle valve 15 and a throttle opening sensor 16 for detecting a throttle opening are provided downstream of the air flow meter 14.

Further, a surge tank 17 is provided downstream of the throttle valve 15. The surge tank 17 is provided with an intake air pressure sensor 18 for detecting an intake air pressure. Still further, the surge tank 17 is provided with an intake manifold 19 for introducing air into the cylinders of the engine 11. A fuel injection valve 20 for injecting fuel is mounted near the intake port of the intake manifold 19 of each cylinder.

On the other hand, an upstream catalyst 22 and a downstream catalyst 23 that are three-way catalysts for reducing CO, HC, and NOx in exhaust gas are arranged in series in the exhaust pipe 21 (exhaust passage) of the engine 11. Further, a first sensor 24 and a second sensor 25 are arranged upstream and downstream of the upstream catalyst 22, respectively, and a third sensor 26 is arranged downstream of the downstream catalyst 23. In this case, an air-fuel ratio sensor (linear A/F sensor) for outputting a linear air-fuel ratio signal responsive to the air-fuel ratio of the exhaust gas flowing into the upstream catalyst 22 is used for the first sensor 24. An oxygen sensor that changes its output voltage stepwisely according to the rich/lean condition of the exhaust gas flowing out of the catalysts 22, 23 is used for the second sensor 25 and the third sensor 26.

Further, the cylinder block of the engine 11 is mounted with a cooling water temperature sensor 27 for detecting a cooling water temperature, and a crank angle sensor 28 for detecting an engine crankshaft rotational position.

Outputs of these various sensors are inputted to an engine control unit (ECU) 29. The ECU 29 is mainly constructed of a microcomputer and executes various programs that are stored in a built-in ROM (storage medium). The programs include routines shown in FIG. 2 to FIG. 4 to perform a feedback control of the air-fuel ratio. Specifically, three feedback controls are performed.

As the first feedback control, the ECU 29 calculates an air-fuel ratio correction factor FAF (step 104 in FIG. 2) based on a deviation of the output of the first sensor 24 provided upstream of the upstream catalyst 22 from its target output (the target air-fuel ratio $\lambda$TG). In this respect, this air-fuel ratio correction factor is a factor for correcting a basic injection quantity and acts as a correction factor for correcting a fuel injection quantity.

In addition, as the second feedback control, the ECU 29 performs a feedback control of setting a target output of the first sensor 24 arranged upstream of the upstream catalyst 22 (a target air-fuel ratio $\lambda$TG on the upstream side of the upper catalyst 22) based on a deviation of the output of the second sensor 25 provided upstream of the downstream catalyst 23 from its target output Vtg.

Figure 3:
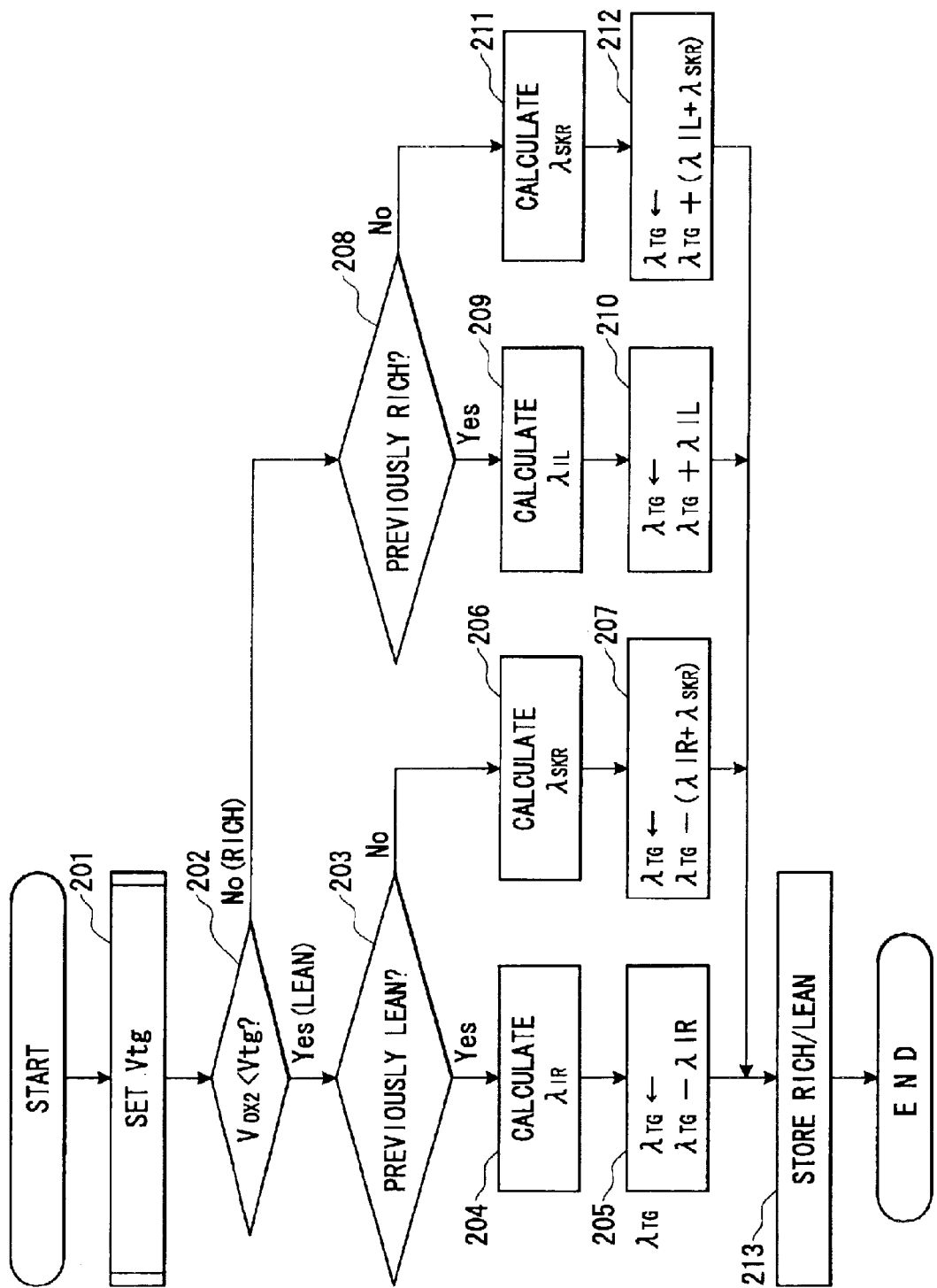
FIG. 3 is a flow chart showing a program for setting a target air-fuel ratio.
Figure 4:
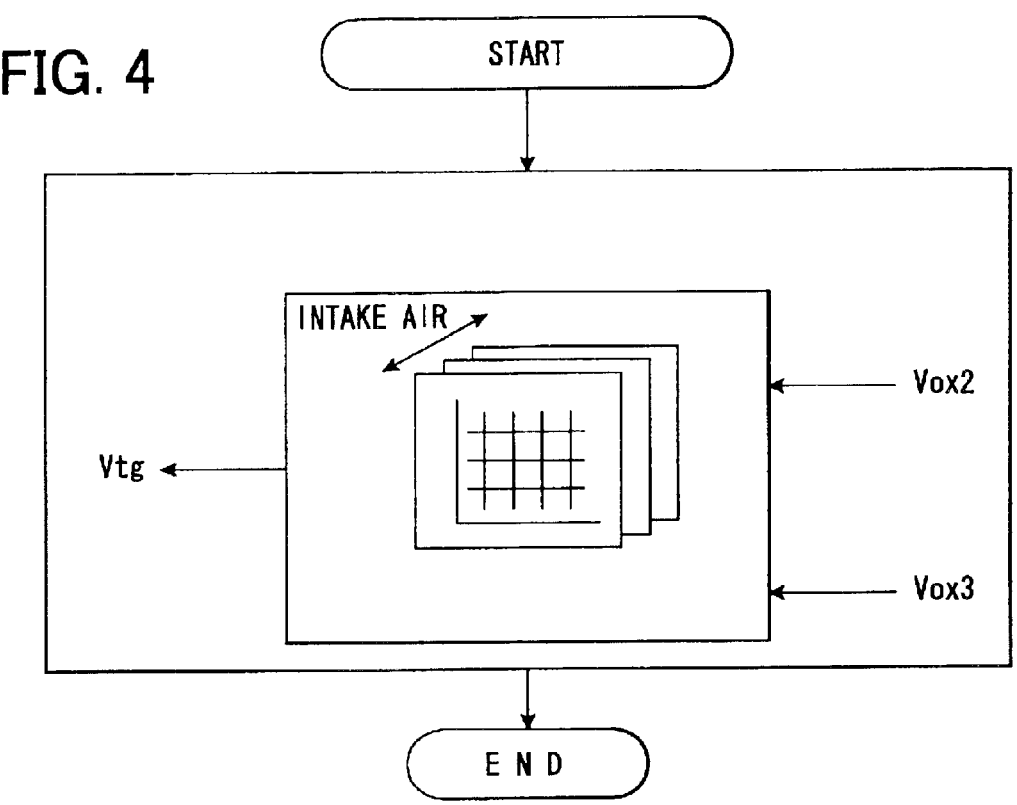
FIG. 4 is a flow chart showing a program for setting a target voltage.

Further, as the third feedback control, the ECU 29 executes the programs shown in FIG. 3 and FIG. 4, thereby setting a target output Vtg (a target air-fuel ratio at the upstream side of the downstream catalyst 23) of the second sensor 25 provided upstream of the downstream catalyst 23 based on the output of the second senor 25 provided upstream of the downstream catalyst 23 and the output of the third senor 26 provided downstream of the downstream catalyst 23.

[Calculation of Fuel Injection Quantity]

Figure 2:
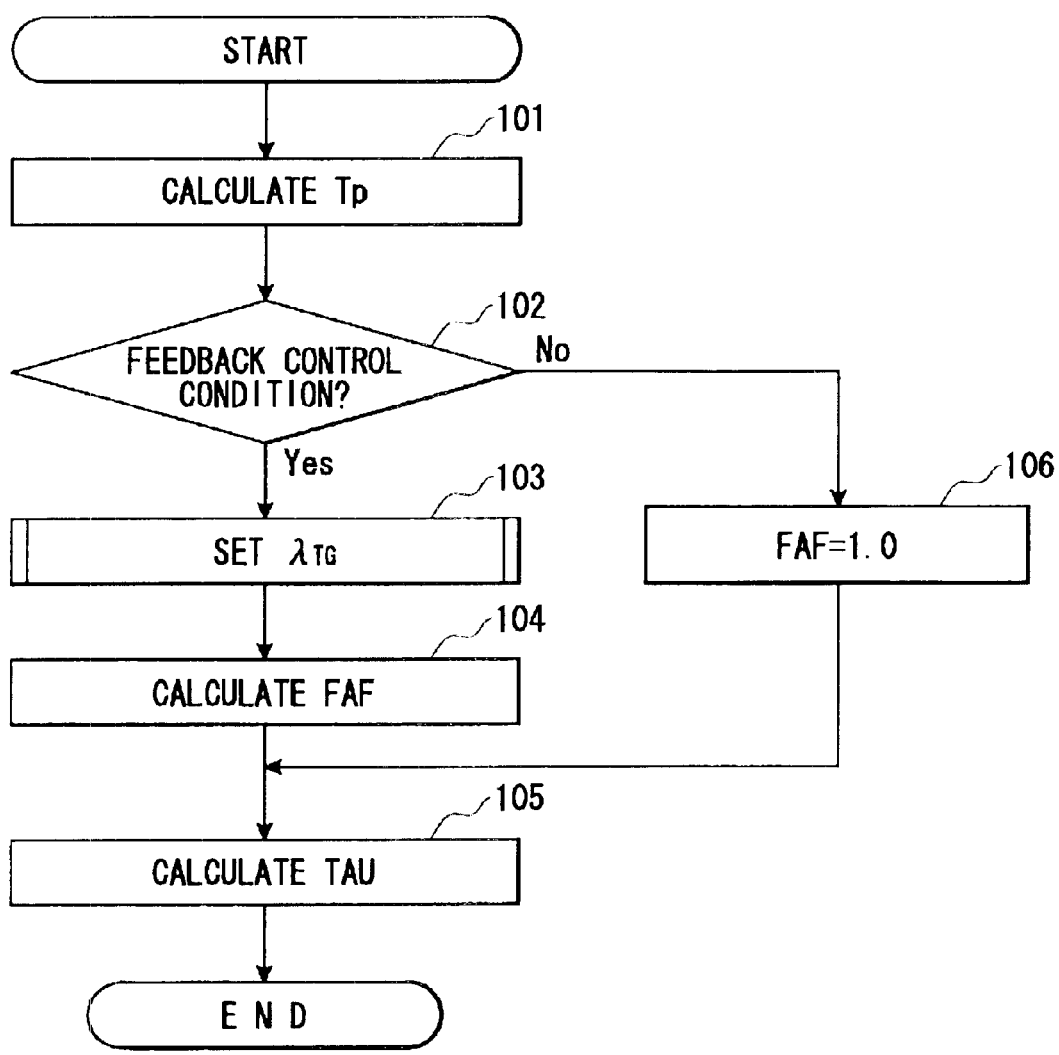
FIG. 2 is a flow chart showing a program for calculating a fuel injection quantity.

A fuel injection quantity calculating program shown in FIG. 2 is a program for setting a required fuel injection quantity TAU through a feedback control of the air-fuel ratio and is executed for each predetermined crankshaft rotation angle. When this program is started, first, at step 101, it calculates a basic fuel injection quantity Tp based on driving condition parameters such as a present intake air pressure PM and the engine rotational speed NE. At the next step 102, it determines whether conditions for an air-fuel ratio feedback (closed-loop) control holds or not. Here, the conditions for the air-fuel ratio feedback control include that the engine cooling water temperature is higher than a predetermined temperature and that the operating condition of the engine is not in a range of high revolution and heavy load. When these conditions are met, the conditions for the air-fuel ratio feedback control hold.

In a case where it is determined at the above step 102 that the conditions for the air-fuel ratio feedback control are not established, the program proceeds to step 106. At step 106, the air-fuel ratio correction factor FAF is set at "1.0" and the program proceeds to step 105. In this case, an air-fuel ratio correction feedback correction is not performed.

On the other hand, in a case where it is determined at the above step 102 that the conditions for the air-fuel ratio feedback control hold, the program proceeds to step 103 where a target air-fuel ratio setting program shown in FIG. 3 is executed to set the target air-fuel ratio $\lambda$TG. Then, the program proceeds to step 104 where the air-fuel ratio correction factor FAF is calculated according to a deviation of the output (air-fuel ratio of the exhaust gas) of the first sensor 24 provided upstream of the upstream catalyst 22.

Thereafter, at step 105, the fuel injection quantity TAU is calculated by the following equation by the use of the basic fuel injection quantity Tp, the air-fuel ration correction factor FAF, and another correction factor FALL, and then the present program is terminated.

$TAU = Tp \times FAF \times FALL$

[Setting of Target Air-Fuel Ratio]

The processing of a target air-fuel ratio setting program (step 103) is shown in FIG. 3. When the present program is started, first, at step 201, a target voltage setting program in FIG. 4 is executed to set the target voltage Vtg of the second sensor 25 by the use of map data according to the output voltage VOX2 of the second sensor 25 (air-fuel ratio on the upstream side of the downstream catalyst 23) and the output voltage VOX3 of the third sensor 26 (air-fuel ratio on the downstream side of the downstream catalyst 23).

According to the map data of this target voltage Vtg, in a case where the output voltage of the third sensor 26 is a basic voltage and the output voltage of the second sensor 25 is rich, the target voltage Vtg is set lean. In a case where the output voltage of the third sensor 26 is a basic voltage and the output voltage of the second sensor 25 is lean, the target voltage Vtg is set rich. Similarly, in a case where the output voltage of the second sensor 25 is the target voltage Vtg and the output voltage of the third sensor 26 is rich, the target voltage Vtg is set lean. In a case where the output voltage of the second sensor 25 is the target voltage Vtg and the output voltage of the third sensor 26 is lean, the target voltage Vtg is set rich.

In this manner, the present embodiment is characterized particularly in that the target voltage Vtg of the second senor 25 is set based on the output voltages of the second sensor 25 and the third sensor 26. Further, when the target voltage Vtg is set, weights are assigned to the output voltage of the second sensor 25 and the output voltage of the third sensor 26. When the velocity of flow of the exhaust gas in the exhaust passage is slow, it takes time for the effect of a change in the air-fuel ratio of the exhaust gas to show up in the second sensor 25 and thereafter in the third sensor 26.

That is, a delay in response in the feedback control becomes large because of a large delay in response in the sensors, so that correction of the second target air-fuel ratio by the third feedback control when the velocity of flow is low is made less reliable by the delay in response. Thus, even if the target voltage Vtg of the second sensor 25 is set only on the basis of the output voltage of the third sensor 26, it is difficult to set a suitable target voltage Vtg, which might make an exhaust emission worse. Therefore, in the present embodiment, as the velocity of flow of intake air becomes slower, more weight is assigned to the output voltage of the second sensor 25 to reduce the effect of the third sensor 26 thereby to set the target voltage Vtg.

After the target voltage Vtg is set, the program proceeds to step 202 in FIG. 3 where it is determined whether the condition of the upstream catalyst 22 is rich or lean by the fact that the output voltage of the second sensor 25 arranged downstream of the upstream catalyst 22 is higher or lower than the target voltage Vtg. At this time, in a case where the condition (air-fuel ratio condition) of the upstream catalyst 22 is lean, the program proceeds to step 203 where it is determined whether or not the air-fuel condition of the upstream catalyst 22 is also lean in the previous processing. In a case where the condition of the upstream catalyst 22 is lean in both the previous and present processing, the program proceeds to step 204 where a rich integral quantity $\lambda IR$ is calculated by the use of the map data or the like according to the present intake air quantity. At this time, the rich integral quantity $\lambda IR$ is set such that as the intake air quantity becomes larger, the rich integral quantity $\lambda IR$ becomes larger. After calculation of the rich integral quantity $\lambda IR$, the program proceeds to step 205 where the target air-fuel ratio $\lambda TG$ is corrected to a rich side by $\lambda IR$ and then the rich/lean condition at that time is stored at step 213.

Further, in a case where the previous condition is determined a rich condition and the present condition is reversed to a lean condition, the program proceeds to step 206 where a skip quantity $\lambda SKR$ to a rich side is calculated by the use of the map data or the like according to the present intake air quantity. At this time, the rich skip quantity $\lambda SKR$ is set such that as the intake air quantity becomes larger, the rich skip quantity $\lambda SKR$ becomes larger. After the calculation of the rich skip quantity $\lambda SKR$, the program proceeds to step 207 where the target air-fuel ratio $\lambda TG$ is corrected to a rich side by ($\lambda IR+\lambda SKR$) and the rich/lean condition at that time is stored at step 213.

On the other hand, in a case where it is determined at the above step 202 that the output voltage VOX2 of the second sensor 25 is higher than the target voltage Vtg (the condition of the upstream catalyst 22 is rich), the program proceeds to step 208 where it is determined whether the previous condition is also rich or not. In a case where both of the previous condition and the present condition are rich, the program proceeds to step 209. At step 209, the lean integral quantity $\lambda IL$ is calculated by the use of the map data or the like according to the present intake air quantity. At this time, the lean integral quantity $\lambda IL$ is set such that as the intake air quantity becomes larger, the lean integral quantity $\lambda IL$ becomes larger. After the calculation of the lean integral quantity $\lambda IL$, the program proceeds to step 210 where the target air-fuel ratio $\lambda TG$ is corrected to a lean side by $\lambda IL$ and the rich/lean condition at that time is stored at step 213.

Further, in a case where the previous condition is lean and the present condition is reversed to a rich side, the program proceeds to step 211 where a skip quantity $\lambda SKL$ to the lean side is calculated by the use of the map or the like according to the present intake air quantity. Thereafter, the program proceeds to step 212 where the target air-fuel ratio $\lambda TG$ is corrected to the lean side by ($\lambda IL+\lambda SKL$) and the rich/lean condition at that time is stored at step 213.

Figure 5A:
FIGS. 5A to 5D are time charts showing an operation of the embodiment with respect to a target air-fuel ratio, an output voltage and a target voltage of a second sensor, and an output voltage of a third sensor.
Figure 5B:
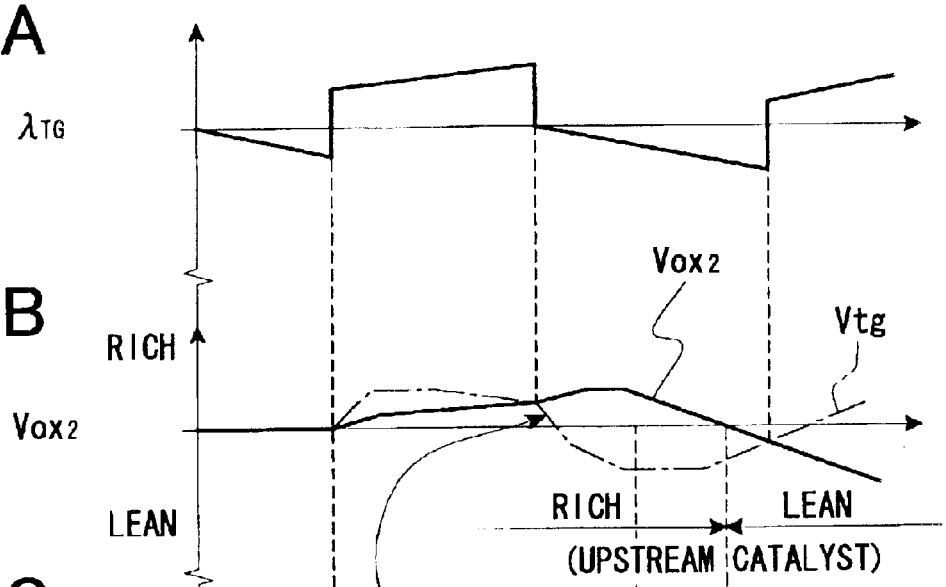
Figure 5C:
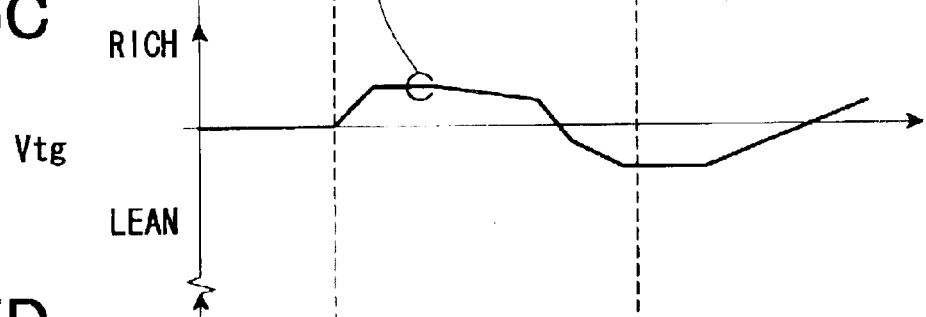
Figure 5D:
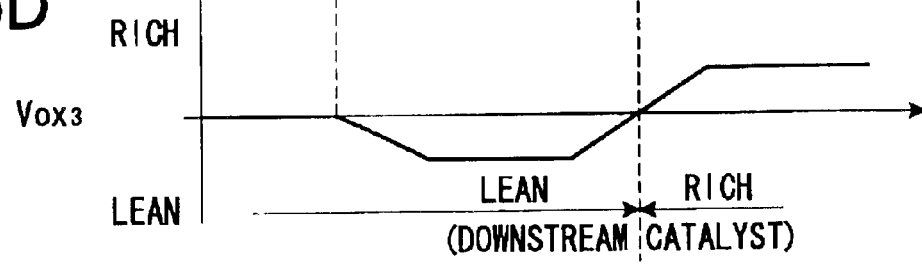

The operation of the air-fuel ratio control of the present embodiment is shown in FIG. 5A to FIG. 5D. A solid line in FIG. 5B shows the output voltage VOX2 of the second sensor 25. Similarly, FIG. 5D shows the output voltage VOX3 of the third sensor 25. In the present embodiment, the target voltage Vtg of the second sensor 25 provided upstream of the downstream catalyst 23 shown in FIG. 5C is set according to the output voltage VOX2 of the second sensor 25 shown in FIG. 5B and the output voltage VOX3 of the third sensor 26 shown in FIG. 5D. Then, as shown in FIG. 5B, every time the output voltage of the second sensor 25 crosses the target voltage Vtg in a comparison of the target voltage Vtg with the output voltage of the second sensor 25 and, as shown in FIG. 5A, the target air-fuel ratio $\lambda TG$ on the upstream side of the upstream catalyst 22 skips to the rich side or the lean side.

By setting the target voltage Vtg by the output voltage of the second sensor 25 and the output voltage of the third sensor 26, for example, even in a case where the output voltage of the second sensor 25 shows the stoichiometric air-fuel ratio condition and the output voltage of the third sensor 26 shows a rich condition, it is possible to unnecessarily correct the target voltage Vtg and hence to optimize the cleaning rate of the downstream catalyst.

Moreover, for example, even in a case where the output voltage of the second sensor 25 shows the rich condition and the output voltage of the third sensor 26 shows the stoichiometric condition, the target voltage Vtg is corrected based on the output voltage of the second sensor 25 as well as the output voltage of the third sensor 26, so that it is possible to quickly optimize the cleaning rate of the upstream catalyst. Thus, it is possible to make a suitable correction also to an expected variation in the air-fuel ratio and hence to prevent the exhaust emission from deteriorating.

Further, in the present embodiment, it is found that a delay in response of the feedback control based on the output voltage of the third sensor 26 is changed by the flow rate of the exhaust gas (intake air quantity), weight is assigned to the output voltage of the second sensor 25 and to the output voltage of the third sensor 26, based on the intake air quantity. That is, in a case where the delay in response is large, the feedback control based on the output voltage of the third sensor 26 is less important. Thus, by increasing the output voltage of the second sensor 25, it is possible to suitably set the cleaning characteristics of the upstream catalyst 22 and the downstream catalyst 23 according to the delay in response.

Figure 6A:
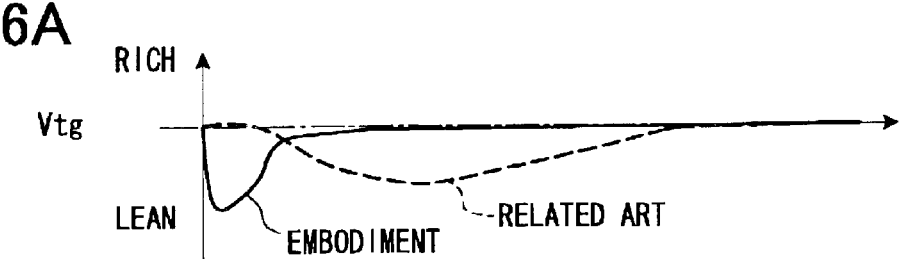
FIGS. 6A to 6C are time charts showing operations of the embodiment and a related art in respect of the target voltage and the output voltage of the second sensor, and the output voltage of the third sensor.
Figure 6B:
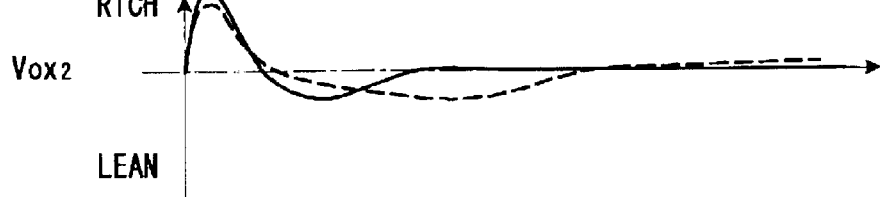
Figure 6C:
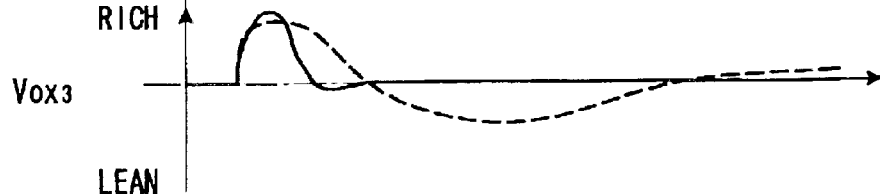

The time charts in FIGS. 6A to 6C show the operation of the output voltage VOX2 of the second sensor 25, the target voltage Vtg, and the output voltage VOX3 of the third sensor 26 in a case where the output voltage of the second sensor 25 is rich and the output voltage of the third sensor 26 is stoichiometric in a related art (dotted line) and in the present embodiment (solid line).

In FIG. 6B, the output voltage of the second sensor 25 becomes rich in the present embodiment and in the related art. At this time, the output voltage of the third sensor 26 shown in FIG. 3C shows the stoichiometric condition in the present embodiment and in the related art. At this time, the target voltage vtg is set as shown in FIG. 6A. More specifically, since the target voltage Vtg in the related art is set based on the output voltage of the third sensor 26, the target voltage Vtg is not corrected until a change shows up in the output voltage of the third sensor 26. In contrast, in the present embodiment, the target voltage is set based on the output voltage of the second sensor 25 as well as the output voltage of the third sensor 26. Thus, the target voltage can be quickly changed.

In this manner, as shown in FIG. 6C, the air-fuel ratio detected by the output voltage of the third sensor 26 is quickly corrected with respect to a sudden variation in the air-fuel ratio. Thus, it is possible to prevent the exhaust gas emission from deteriorating.

Here, in the present embodiment, the intake air quantity is used when weight is assigned to the output voltage of the second sensor 25 and the output voltage of the third sensor 26. However, a parameter used in place of the velocity of flow of the intake air is not limited to the intake air but, for example, the crankshaft rotational speed (engine rotational speed) may be used. Moreover, in a system for detecting the intake air pressure, it is also recommendable to assign weight based on the intake air pressure. Further, it is also recommendable to use the intake air quantity, the rotational speed NE, and the intake air pressure in combination.

Further, in the present embodiment, the target voltage Vtg of the feedback control based on the output voltage of the second sensor 25 is set on the basis of the output voltage of the second sensor 25 and the output voltage of the third sensor 26. In place of this, even if the control gain of the feedback control based on the output voltage of the second sensor 25 is changed, it is possible to produce the same effect as the present embodiment.

Still further, in the present embodiment, the oxygen sensor the output of which changes stepwisely at a predetermined air-fuel ratio is used for the second sensor 25 and the third sensor 26, but it is not intended to limit the sensors 25, 26 to the oxygen sensor. It is also recommendable to use a linear A/F sensor that linearly detects an air-fuel ratio.

Still further, in the present embodiment, the control based on the respective sensors is the feedback control, but an advanced control or the like may be used if it is a PID control.

Still further, in addition to the present embodiment, it is also recommended that the temperatures of the upstream catalyst 22 and the downstream catalyst 23 be detected or estimated and that a feedback control responsive to the cleaning characteristics of the catalysts be performed according to the detected temperatures of the catalysts. In a case of detecting the temperature of the catalyst, it is only necessary to provide a catalyst temperature detecting sensor. In a case of estimating the temperature of the catalyst, it is recommended that an exhaust gas temperature is estimated according to the operating condition and that the temperatures of the respective catalysts be estimated based on the estimated exhaust gas temperature.

What is claimed is:

1. An exhaust gas cleaning system for an internal combustion engine having an upstream catalyst and a downstream catalyst arranged in series in an engine exhaust, the system comprising:

first feedback control means for correcting a quantity of fuel supplied to the internal combustion engine based on a first air-fuel ratio on an upstream side of an upstream catalyst and a first target air-fuel ratio on the upstream side of the upstream catalyst;

second feedback control means for correcting a first target air-fuel ratio based on a second air-fuel ratio on a downstream side of the upstream catalyst and a second target air-fuel ratio on a downstream side of the upstream catalyst;

third feedback control means for correcting the second target air-fuel ratio based on the second air-fuel ratio and a third air-fuel ratio on a downstream side of a downstream catalyst arranged downstream of the upstream catalyst; and operating condition detecting means for determining an operating condition of the internal combustion engine, wherein the third feedback control means corrects the second target air-fuel ratio based on an operating condition detected by the operating condition detecting means, the second air-fuel ratio and the third air-fuel ratio, wherein the operating condition detecting means includes flow rate detecting means for determining an exhaust gas flow rate in the engine exhaust, and wherein the third feedback control means assigns weight on the second air-fuel ratio determined by the second air-fuel ratio detecting means and the third air-fuel ratio determined by the third air-fuel ratio detecting means based on the exhaust gas flow rate detected by the flow rate detecting means, and corrects the second target air-fuel ratio based on the second air-fuel ratio and the third air-fuel ratio on which weight is assigned, wherein the operating condition detecting means includes temperature detecting means for determining a temperature in the exhaust gas passage, and wherein the third feedback control means corrects the second target air-fuel ratio based on the temperature in the exhaust gas passage detected by the temperature detecting means, the second air-fuel ratio and the third air-fuel ratio.

2. The exhaust gas cleaning system for an internal combustion engine as in claim 1, wherein the temperature detecting means determines a temperature of at least one of the upstream catalyst and the downstream catalyst.

* * * * *